Aug. 22, 1967        J. L. GROOM        3,336,668
COMPOUND POWER DEVICE FOR SHEARS, PLIERS AND THE LIKE
Filed June 18, 1965                    5 Sheets-Sheet 1
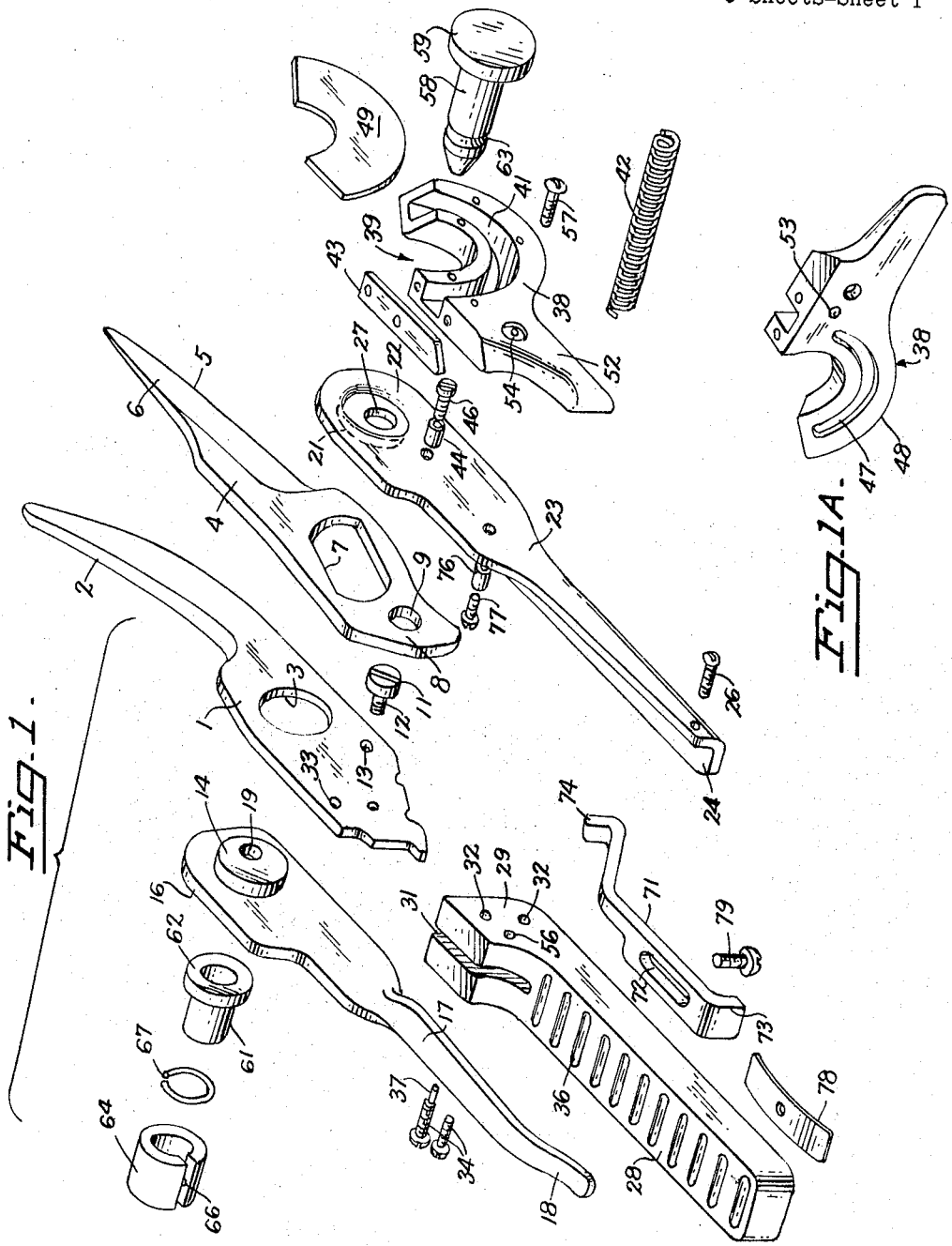
INVENTOR
JOSEPH L. GROOM
BY
George B White
ATTORNEY

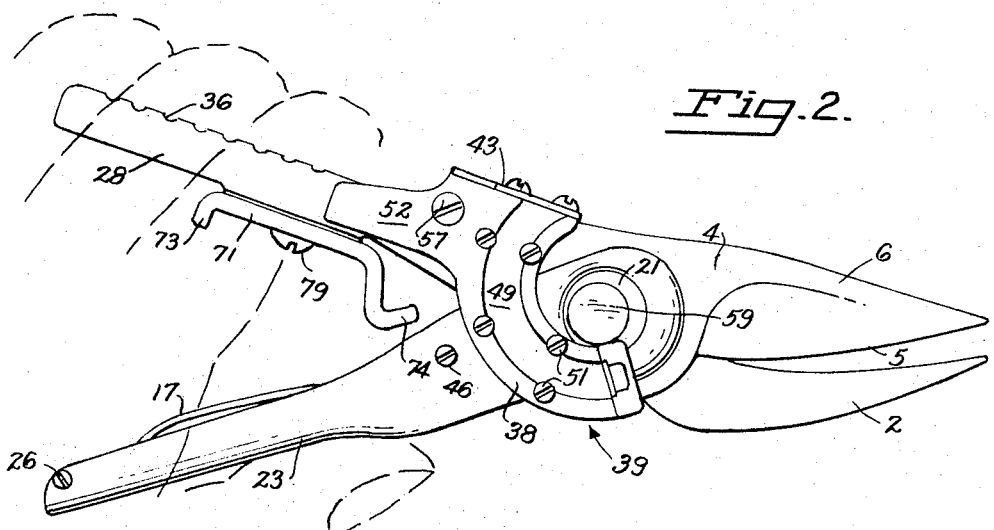
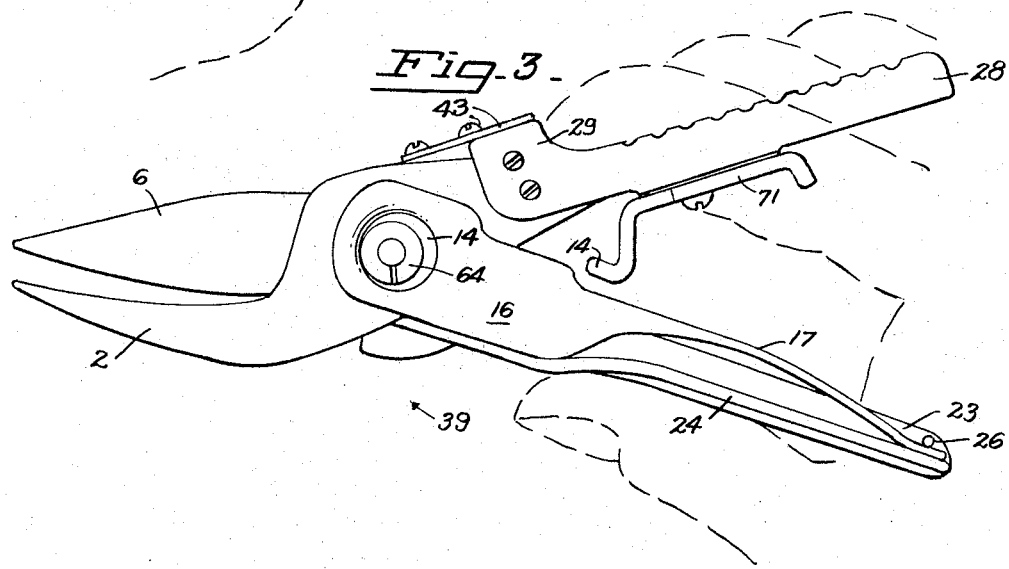
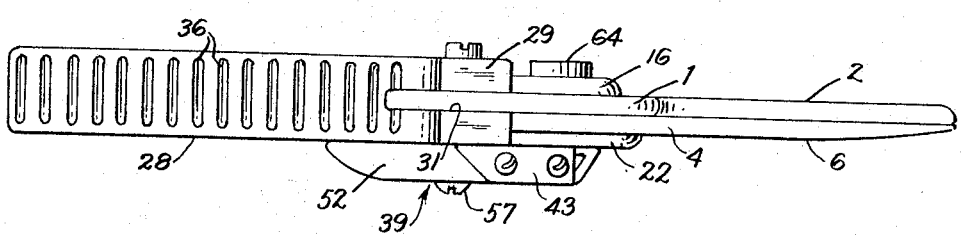

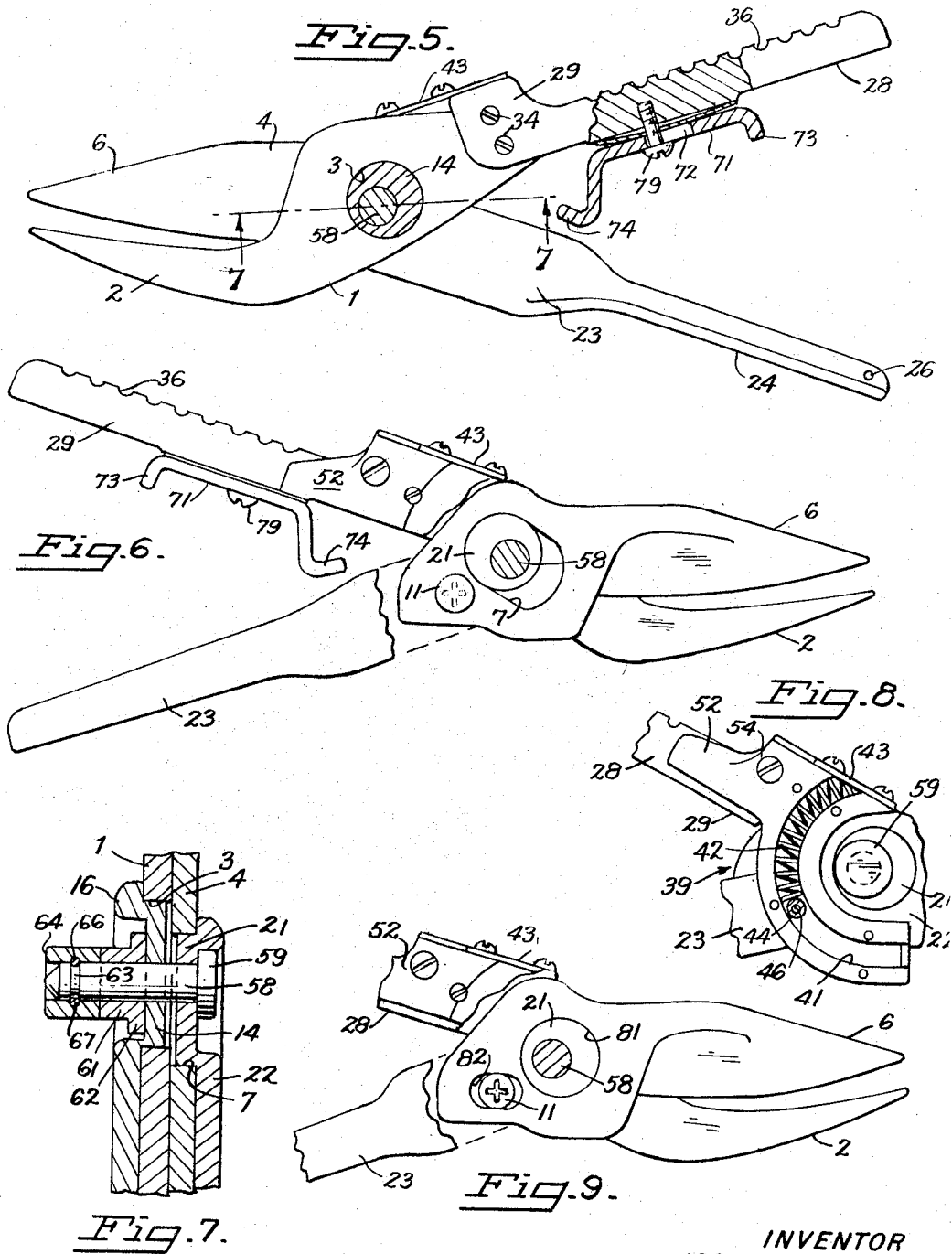

United States Patent Office 3,336,668
Patented Aug. 22, 1967

3,336,668
COMPOUND POWER DEVICE FOR SHEARS, PLIERS AND THE LIKE
Joseph L. Groom, 169 Middle Rincon Road, Santa Rosa, Calif. 95405
Filed June 18, 1965, Ser. No. 464,929
17 Claims. (Cl. 30—239)

This invention relates to a compound power device for shears, pliers and the like.

The primary object of the invention is to provide a connection between a frame and a lever or blade having coacting jaws, the connection being through independently working eccentric cams manipulated by levers or handles in such a manner that the eccentric cams exert a compound power to increase the cutting or gripping power exerted by the closing of the jaws.

Particularly it is an object of the invention to provide compound leverage exerted on closing members or jaws of a shear or plier by a pair of handles connected to the respective members independently by eccentric cams working in corresponding holes in the frames of the respective members in such a manner as to compound the leverage exerted by manipulation of the handles.

Another object of this invention is to provide a pair of frames with suitable jaws for cutting or for gripping, and with aligned holes through the adjacent and superimposed flat frames, handles or levers being connected to the respective frames by means of eccentric cams fitting in the respective holes and so related to the handles that when the handles are moved together they exert a shearing or gripping leverage, the respective eccentric cams moving the frames or members so as to close the gripping or shearing jaws together, and so that after a certain predetermined closing of the jaws one of the eccentric cams being yieldably held by the movement of the other eccentric cam independently exerts a final additional force.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a diagrammatic illustrative view of the parts of a shear constructed in accordance with the invention.

FIG. 1-A is a perspective view of the casing of the spring returning device.

FIG. 2 is a side view of a form of the shear of this invention showing it in partially closed attitude.

FIG. 3 is a side view of the shear viewing the shear from a side opposite to the side shown in FIG. 3.

FIG. 4 is an edge view of a shear.

FIG. 5 is a partly sectional side view of the shear in closed position.

FIG. 6 is a partly sectional side view of the shear viewing from the side opposite to the side shown in FIG. 5.

FIG. 7 is a fragmental, cross sectional view showing the eccentric structure of the shear.

FIG. 8 is a fragmental view of the spring device for urging the shear to jaw-opening position.

FIG. 9 is a fragmental view partly in section of a modified fulcrum connection between the frames of the shear.

Figure 10:
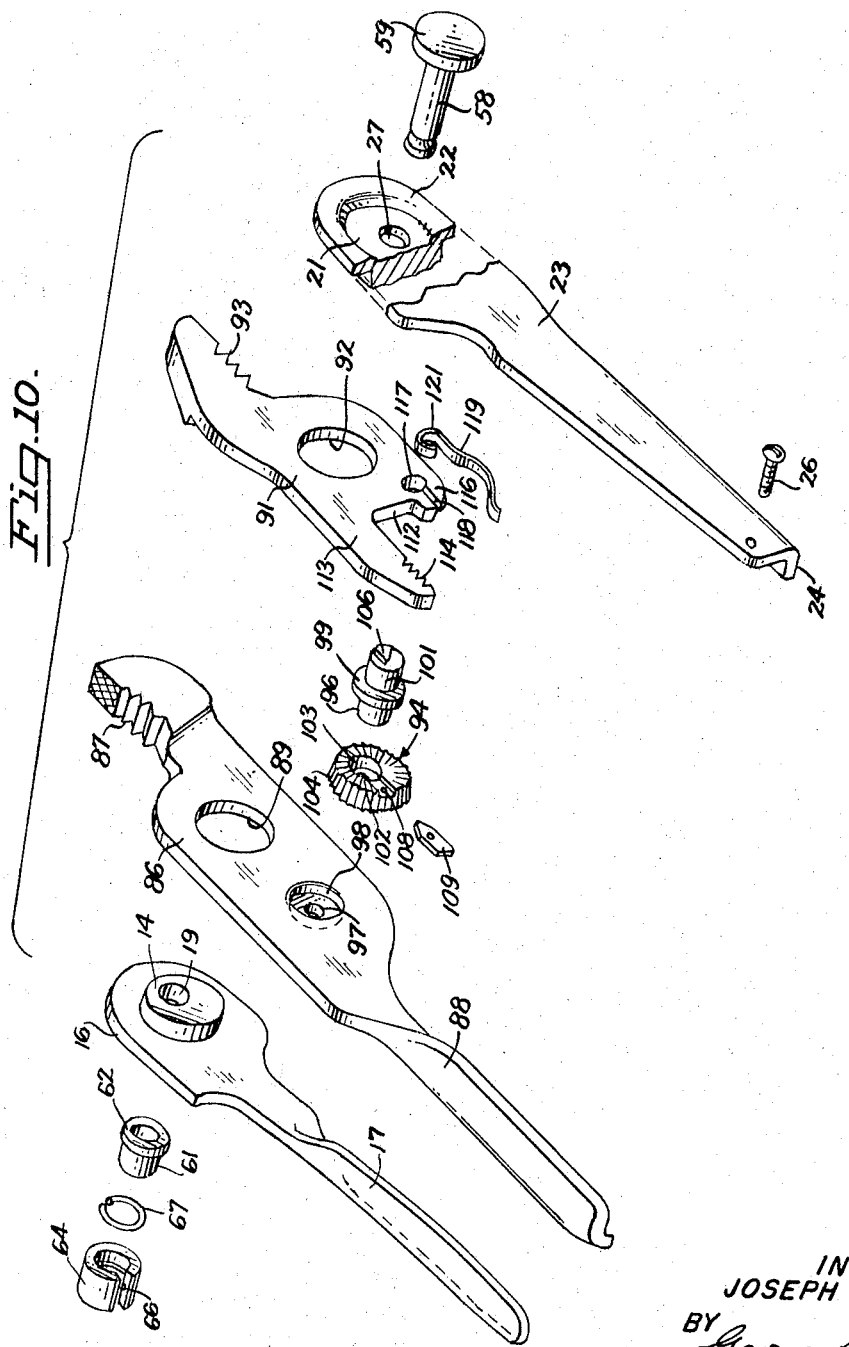
FIG. 10 is a developed view of a plier structure.
Figure 11:
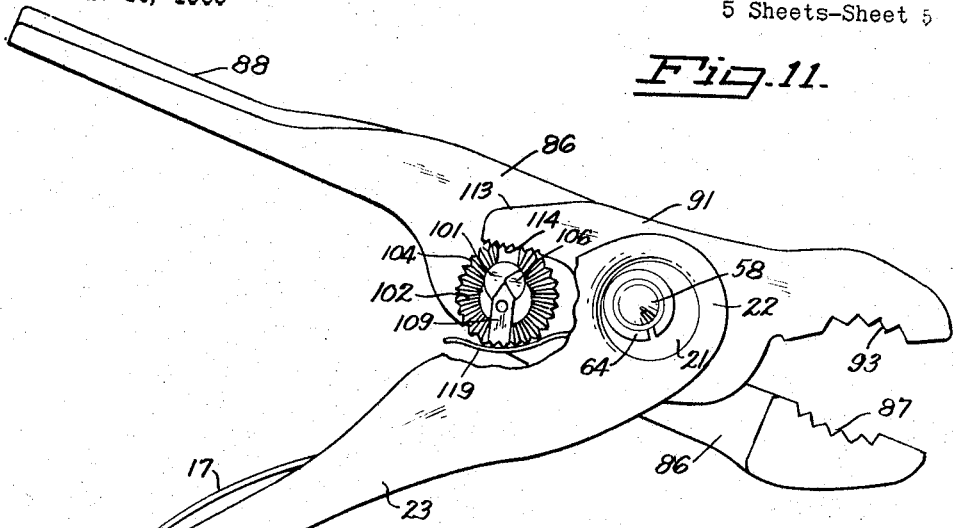
FIG. 11 is a fragmental side view of the plier structure showing the position of the jaws so adjusted as to set the jaws to the widest grip opening.
Figure 12:
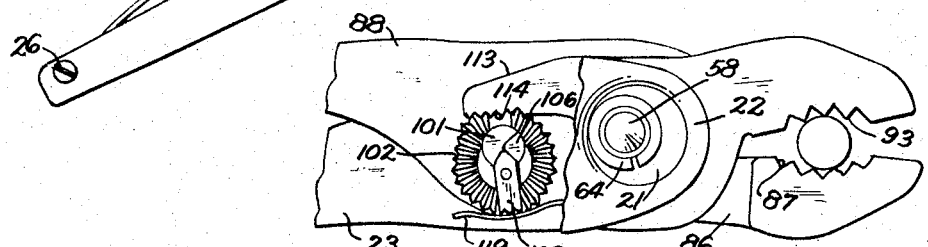
FIG. 12 is a fragmental view showing the plier jaws closed in said pre-set wide attitude.

In the illustrative embodiments shown in FIGS. 1 to 8 inclusive, the shear has a frame 1 on which is formed a jaw in the form of a blade rest 2 at a suitable curvature. The frame 1 is a flat sheet material preferably forged so as to form the blade rest 2. An opening in the form of a circular hole 3 is provided in the frame 1. A second frame is a blade sheet 4 and has formed thereon, preferably by forging, a complemental jaw in the form of a cutting blade 6 the edge 5 of which cutting blade 6 is so offset from the plane of the blade sheet 4 as to be opposite and along a face of the blade rest 2. The blade sheet 4 has a generally rectangular opening 7 therethrough. The longitudinal axis of the opening 7 is at an angle to the plane of and converges toward the cutting edge of the blade 6. The frame 1 and the blade sheet 4 are superimposed so that the openings 3 and 7 are generally in registry.

In the tail 8 of the blade sheet 4 is provided a hole 9 which fits over the head 11 of a bolt 12 screwed into a threaded hole 13 in the tail of the frame 1. The coaction of the bolt head 11 and the hole 9 forms the fulcrum about which the blade sheet 4 is moved relatively to the frame 1 for closing or opening the jaw portions, namely the cutting edge of the cutting blade 6 relatively to the blade rest 2 whereby the cutting is performed.

Movement and power is applied to the superimposed frame 1 and the blade sheet 4 by means of suitable eccentric cams. A cam 14 fits into the circular hole 3. The cam 14 is formed integrally on a flat cam plate 16 superimposed on the side of the frame 1 opposite from the blade sheet 4. From the cam plate 16 extends a spring lever 17 which is curved at its free end 18. The cam 14 has a hole 19 therethrough and through the lever plate 16. This hole 19 is offset from the center of the generally circular cam 14 toward the blade rest 2 when the cam 14 is in the hole 3 in an initial position.

A second circular cam 21 is positioned in the rectangular opening 7. This second cam 21 is formed integrally on a handle plate 22. A handle 23 extends from the handle plate 22 and has a longitudinal flange 24 at right angles to the plane of the handle 23 so as to form an abutment for the spring lever 17. In the free end of the handle 23 is provided a stop screw or stop pin 26 which extends spaced above the flange 24 so as to be above the curved end or tongue 18 thereby to confine the end of the spring lever 17. In this form the flange 24 forms a brace for the operation of the spring lever 17. The second circular cam 21 has a hole 27 therethrough offset from the center of the cam 21 generally toward the handle 23, namely oppositely to the direction of offset of the hole from the center of the first cam 14.

The cams 14 and 21 project respectively from the planes of the cam plate 16 and the handle plate 22 so as to be confined and work respectively within the circular hole 3 and in the rectangular opening 7, as shown in detail in FIG. 7.

A second handle 28 has a head 29 with a slot 31 therein fitting over the tail of the frame 1. A pair of holes 32 extend through the forked head 29 which are in registry with the corresponding pair of holes 33 in the tail of the frame 1 to accommodate securing screws 34, which screws 34 secure the head 29 of the second handle 28 to the tail of the frame 1. The second handle 28 has suitable serrations or corrugations 36 thereon to facilitate gripping.

One of the screws 34 has a reduced end projecting beyond the head 29 to serve as a locating dowel pin 37 for locating the casing 38 of a spring return mechanism 39. The casing 38 is formed with an arcuate pocket 41 to accommodate a coil spring 42. The top ends of the pocket 41 are covered by a cover plate 43 which is held in place by suitable screws. The spring at one end bears against the cover plate 43. The other end of the coil spring 42 nearest to the cam 21 bears against a sleeve 44 on a stop screw 46 secured in the handle plate 22 so that the sleeve 44 extends through an arcuate slot 47 in the base or back 48 of the casing 38 and moves in the arcuate pocket 41. The face of the arcuate pocket 41 is covered by an arcuate cover plate 49 held in place by the heads of screws 51 threaded into the adjacent portions of the casing 38.

The casing 38 is formed with a hand guard 52 which lies flat along one side of the second handle 28. A hole 53 in the back 48 of the casing 38 engages the dowel pin 37 when the spring return mechanism 39 is in proper position. A counter-sunk hole 54 through the hand guard 52 is spaced from the hole 53 in the same relation as the hole 32 from which the dowel pin 37 extends is related to a threaded hole 56 in the handle head 29. A suitable bolt 57 extended through the counter-sunk hole 54 and threaded into the threaded hole 56 fastens the casing 38 of the spring return mechanism on to the head 29 of the second handle 28. The portion of the casing 38 in which the arcuate pocket 41 is located projects beyond the forked head 29 of the second handle 28 and over the handle plate 22 so that it straddles the handle plate 22. Thus through its bearing on the sleeve 44 on the stop screw 46 the coil spring 42 normally urges the handle 23 and the second handle 28 apart from one another into jaw-opening initial position.

The aforementioned parts are held assembled together by a journal device including journal pin 58 which has a head 59 on one end thereof. The pin 58 fits through the holes 27 and 19 of the cams 21 and 14 respectively so that the head 59 of the pin 58 is partly concealed in the recess on the outside of the cam 21, as shown in FIG. 7. The journal pin 58 projects beyond the cam 14 and it has on it a washer 61. A bearing end 62 of the washer 61 bears against the exposed or outer face of cam 14 and is concealed within the recess formed in the lever plate 16 on the outside of the cam 14. The free end of the journal pin 58 has an annular groove 63 therein. A locking sleeve 64 also has an interior annular groove 66 complementing the annular groove 63 of the journal pin 58. The locking sleeve 64 is axially split so as to tightly snap over the end of the journal bolt 58 with limited resiliency or yieldability. A lock spring 67 in the interior annular groove 66 of the locking sleeve 64 snaps into the annular groove 63 of the journal pin 58 so as to tightly hold the assembly together and prevent accidental loosening of the journal.

On the under side of the second handle 28 is secured a latch lock 71. This latch lock is a plate with an elongated slot 72 therein, one end of which has a handle flange 73 thereon for pulling and pushing the latch lock. The other end of the latch lock 71 has a hook 74 formed thereon which fits under a keeper sleeve 76 on a screw 77 secured in the cam plate 22 so that when the handles 23 and 28 are pressed together against the action of the arcuate coil spring 42, and the latch lock 71 is pushed toward the cams so as to shift the hook 74 to the keeper sleeve 76, then the keeper sleeve 76 is pressed into the hook 74 and holds the handles 23 and 28 together. A leaf spring 78 is located between the latch lock 71 and the adjacent bottom face of the handle 28. A screw 79 extends through the elongated slot 72 and through the leaf spring 78 and is screwed into the handle 28 so as to hold the latch lock 71 slidably in place.

The rectangular opening 7 in the blade sheet 4 accommodates the relative shifting of the blade sheet 4 about the fulcrum bolt head 11 which movement is caused by the eccentric turning of the cam 21 in the rectangular hole 7 when the handles 28 and 23 are forced toward one another. In the form shown in FIG. 9 a circular hole 81 takes the place of the rectangular opening 7 in the blade sheet 4, but the fulcrum hole 82 around the fulcrum head 11 is elongated generally longitudinally with respect to the blade sheet 4 so as to permit the shifting of the blade sheet 4 on its fulcrum 11 to compensate for the turning movement caused by the cam 21.

In the form shown in FIGS. 10 to 14 inclusive, the jaws are in the form of gripping jaws of a plier. In this form the jaw plate 86 which has a plier jaw 87 thereon, has a fixed handle 88 thereon. The jaw plate has in it a circular opening 89 to accommodate cam 14 as heretofore described in connection with the first described form. The cam 14 is on the lever plate 16 which is superimposed on the adjacent face of the jaw plate 86. The spring lever 17 extends as heretofore described.

The second jaw plate 91 corresponds to the blade sheet 4 and it has an opening or hole 92 therein to accommodate the second cam 21, the handle plate 22 of which has the same kind of handle 23 as heretofore described to work together with the spring lever 17. The jaw plate 91 has a complemental jaw 93 thereon suitably offset to work with the other jaw 87. The assembly is held together by the same journal structure as heretofore described. However, in this form an adjustable fulcrum device 94 is provided so as to permit the pre-setting of the jaws to wider or narrower grips.

This adjustable fulcrum device 94 includes a fulcrum pin 86 suitably secured in a hole 97 in the jaw plate 86 in the same fulcrum position as heretofore described. There is a circular recess 98 in the jaw plate 86 concentric with the hole 97. This recess 98 is located in the face of the jaw plate 86 adjacent to the superimposed second jaw plate 91. The fulcrum pin 96 has an annular flange 99 thereon which fits into the recess 98. The end of the fulcrum pin 96 at the end of the hole 97 outside of the recess 98 is peened over or riveted in such a manner as to hold the fulcrum pin in the jaw plate 86. The other end 101 of the fulcrum pin 96 is about as long as the thickness of the second jaw plate 91 and extends from the flange 99 so as to hold thereon an adjustable eccentric fulcrum cam 102.

The eccentric fulcrum cam 102 has an eccentric hole 103 rotatably held on the fulcrum pin end 101. The periphery 104 of the fulcrum cam 102 is chamfered and serrated. The end of the pin 101 has formed thereon a generally triangular shaped abutment 106. The exposed face 107 of the fulcrum cam 102 is also roughened or serrated to facilitate the manipulation for turning the fulcrum cam 102 for adjusting the grip of the plier as hereinafter described. A radical dovetailed groove 108 is cut into the exposed face 107 extending from the outer periphery to the eccentric hole 103. A limit plate 109 is suitably secured in the dovetailed grove 108 and it has a pointed end 111 to engage one or the other side of the triangular abutment 106 in the respective extreme adjusted positions of the fulcrum cam 102. The dovetailed groove 108 is on the side of the maximum rise of the fulcrum cam 102.

The jaw plate 91 has a recess 112 and a tail 113 extended above the recess 112. The underside of the tail 113 has serrations 114 thereon for engagement with the serrated cam periphery 104. In a lug 116 on the lower side of the recess 112 is a hole 117 and a slit 118 to accommodate a spring 119. The curved end 121 of the spring 119 is anchored in the hole 117, and the spring 119 is so shaped that it conforms to and bears against the adjacent portion of the cam periphery 104 as shown in FIGS. 11 to 14 inclusive.

Figure 13:
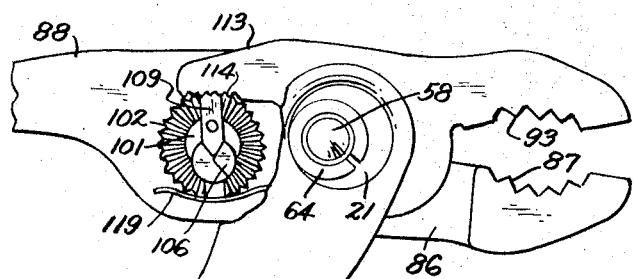
FIG. 13 is a side view of the plier structure with the independent eccentric fulcrum connection and adjustment to smallest grip with jaws open.
Figure 14:
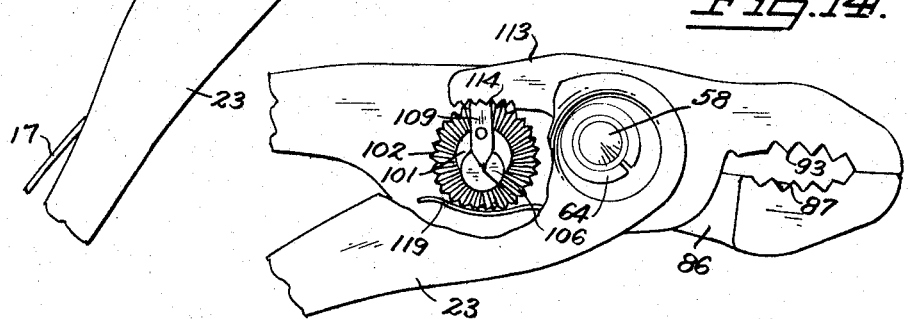
FIG. 14 is a fragmental side view of the plier structure showing the adjustment of FIG. 13, with jaws closed.

When the fulcrum cam 102 is adjusted so that its rise or the peripheral portion most eccentric to the pin 110 bears against the serrations 114 of the tail 113, it raises the tail 113 and adjusts the jaw plate 91 to the narrowest grip namely when the handles are moved together from the position shown in FIG. 13 to the position shown in FIG. 14 the jaws are completely closed. When the fulcrum cam 102 is turned around and adjusted so that its peripheral portion closest to the fulcrum pin 96 is in engagement with the serrations 114 of the tail 113 and the spring 119 bears against the periphery of the cam rise, then the jaw plate 91 is adjusted to an initial position corresponding to the widest grip, namely when the handles are pressed together from the position shown in FIG. 11 to the position shown in FIG. 12, the jaws 93 and 87 will be still spaced apart for a wider grip. By this adjustment when the handles are pressed together so that pressure is exerted on the spring lever 17, the coaction between the tail 113 of the jaw plate 91 and the position of the respective cams in the holes 89 and 92 is such that force exerted on the jaws 87 and 93 outwardly namely for pushing them apart, and on the serrations 114 against the cam periphery 104 causes the jaws to lock on the object gripped in such a manner that a pull on the object girpped will maintain the jaws in gripping position even though the pressure on the handles is relaxed. The spring lever 17 in this form helps release the grip.

In operation the handles are gripped in hand as shown in FIGS. 2 and 3 and are pressed toward one another in the usual manner. The turning of the handles turns the respective cams 14 and 21 in the respective holes 3 and 7, or 89 and 92, in opposite directions and thereby turns the blade sheet 4 about the fulcrum pin 11, or in the case of the plier the jaw plate 91 relatively to the fulcrum periphery 104 for closing the respective jaws together. The final tight pressure pressing the handles together flexes the spring lever 17 while the handle 23 is held in position and the flexing of the spring 17 gives a further separate turn to the cam 14 for an additional and compound pressure for cutting or gripping.

In the form shown in FIGS. 1 to 9 inclusive, the spring return device 39 by reason of the compression of the coil spring 42, when the handles 23 and 28 are pressed together, functions to open the shear when the manual pressure on the handles is released or relaxed. In the plier form of the invention shown in FIGS. 10 to 14 inclusive, there is no such spring return device, but the jaws 87 and 93 will remain locked on the object gripped by the action of the adjustable fulcrum device 94.

I claim:
1. In a device of the character described,
  (a) a pair of superimposed flat members formed with opposite coacting jaws,
  (b) said flat members having registering holes,
  (c) a first eccentric cam and a second eccentric cam moveable independently in the respective holes, said cams having eccentric holes therethrough forming eccentric fulcrums respectively,
  (d) a flat element for each cam from which said cam extends into the adjacent hole,
  (e) a cam journal fastener extending through said eccentric holes in said cams for holding said members, said cams and said elements together rotatably,
  (f) a first handle extended from the flat member adjacent the first cam,
  (g) a cam handle extended from the flat element of the second eccentric cam in manipulating relation to said first handle.
2. The invention defined in claim 1 and
  (h) a spring lever extended from the flat element of the first cam and bearing on the cam handle to exert additional power of the first cam after said handles are pressed together.

3. The invention defined in claim 1 and
  (h) the eccentric fulcrums of said cams being journalled on said journal fastener and being offset in opposite directions from the centers of the respective registering holes.
4. The invention defined in claim 3 and
  (i) fulcrum means to rotatably connect said flat members.
5. In a device of the character described,
  (a) a first flat frame,
  (b) a second flat frame superimposed on the first flat frame,
  (c) a jaw on each frame, the jaws being opposite and complemental to one another,
  (d) a first handle extended from the first flat frame,
  (e) a tail on the second flat frame,
  (f) means to fulcrum the tail of the second flat frame on the first flat frame, said frames having substantially reigstering holes,
  (g) an eccentric cam in each of said holes,
  (h) a cam plate of each cam superimposed on the respective adjacent face of the adjacent frame,
  (i) journal means extended through said cams and through said holes to hold said frames and cams relatively rotatably together,
  (j) a cam handle extended from the cam plate farthest from said first handle,
  (k) a spring lever extended from the other cam plate and bearing against said cam handle so as to move with said cam handle and to be compressed and apply additional power to its cam after the closing of said handles together,
  (l) the eccentricity of said cams being in opposite directions to one another whereby when said cams are turned in the same direction force is exerted for turning said plates relatively toward one another in opposite directions about said fulcrum respectively for closing and opening said jaws.
6. The invention defined in claim 5 and
  (m) spring returning means to normally urge said handles apart for opening said jaws,
  (n) said jaws being complemental blades for shearing.
7. The invention defined in claim 6 and
  (o) said resilient urging means including a housing mounted on said first handle and extended over said cam handle,
  (p) a coil spring in the housing,
  (q) an abutment extended from said cam handle and projecting into said housing and being moveable in said housing for compressing said spring when said handles are pressed together.
8. The invention defined in claim 5, and
  (m) said fulcrum means including a fulcrum pin secured on said first handle,
  (n) an eccentric fulcrum cam rotatable on said pin,
  (o) a tail on the second frame engageable with the periphery of said eccentric fulcrum cam to predetermine the relation of the jaws on the frames,
  (p) and a spring member extended from said second frame spaced opposite from said tail and bearing against the periphery of said eccentric fulcrum oppositely to said tail thereby to hold said second frame and said fulcrum in adjusted position.
9. In a device of the character described,
  (a) a first flat plate,
  (b) a second flat plate superimposed on the first flat plate,
  (c) said first plate having a first cam hole therein,
  (d) said second plate hving a second cam hole therein,
  (e) a first cam plate superimposed on the exposed face of said first plate,
  (f) a second cam plate superimposed on the exposed face of said second plate,
  (g) a first cam on said first cam plate projecting into said first cam hole, (h) a second cam on said second cam plate projecting into said second cam hole,
(i) a jaw on each of said flat plates, said jaws being substantially opposite to and coacting with one another when said flat plates are turned relatively to one another,
(j) fulcrum means connecting said flat plates so that said flat plates are turnable about said fulcrum means for moving said jaws together and apart respectively,
(k) a first handle extended from said first flat plate,
(l) a second handle extended from said second cam plate in manipulative relation to said first handle for turning said second cam in the said second hole thereby to turn said second plate about said fulcrum means,
(m) a spring handle extended from said first cam plate and bearing against said second handle so as to be acted upon by said second handle when said handles are moved together thereby to turn said first cam in said first hole beyond the degree of turning by said handles to exert additional closing force on said jaws,
(n) said cams being offset in opposite directions from the respective centers of said cam holes for turning said flat plates and said jaws in opposite directions when said handles are manipulated.

10. The combination defined in claim 9, and
(o) said second cam hole being elongated to compensate for arcuate movement of said second jaw plate about said fulcrum means.

11. The combination defined in claim 9, and
(o) said fulcrum means including a journal projection from said first jaw plate offset from said holes toward said handles, and said second jaw plate having a journal opening rotatably engaging said journal projection.

12. The combination defined in claim 11, and
(p) said journal opening being elongated generally toward said second cam hole to compensate for arcuate movement of said second jaw plate about said projection.

13. The combination defined in claim 9, and
(o) said jaws being formed respectively into a blade rest on said first jaw plate and into a shearing plate on said second jaw plate.

14. The combination defined in claim 9, and
(o) said jaws being formed respectively into opposite gripping jaws.

15. The combination defined in claim 14 and
(p) said fulcrum means including a fulcrum pivot in said first handle at said first flat plate,
(q) an eccentric fulcrum cam journalled on said pivot,
(r) a tail projection on said second flat plate bearing against the periphery of said eccentric cam to determine the initial angular position of said second flat plate relatively to said first flat plate and thereby predetermine the spacing between the gripping position.
(s) and spring means on said second flat plate coacting with said eccentric fulcrum cam to hold said eccentric fulcrum cam and said second flat plate in relatively adjusted position when turning about said pivot.

16. The combination defined in claim 15 and
(p) said fulcrum means including a fulcrum pivot in said first handle at said first flat plate,
(q) an eccentric fulcrum cam journalled on said pivot,
(r) a tail projection on said second flat plate bearing against the periphery of said eccentric cam to determine the initial angular position of said second flat plate relatively to said first flat plate and thereby predetermine the spacing between the gripping jaws in gripping position,
(s) and spring means on said second flat plate coacting with said eccentric fulcrum cam to hold said eccentric fulcrum cam and said second flat plate in relatively adjusted position when turning about said pivot.
(t) and coacting limiting means on said pivot and on said eccentric fulcrum cam to limit relative adjustment of said cam to a maximum and to a minimum grip spacing.

17. A fulcrum device for connecting levers and the like of a lever assembly, comprising
(a) a pivot pin,
(b) a head on one end of the pivot pin bearing against one face of the lever assembly,
(c) washer means on said pivot pin bearing against the other face of the lever assembly,
(d) said pin having an annular groove on the free end thereof projecting beyond the washer,
(e) a split collar having an annular groove on its periphery complementing the annular groove on said pin,
(f) and a split spring ring in said grooves for holding said collar on said pin.

References Cited
UNITED STATES PATENTS

| | | | |
|---|---|---|---|
| 481,200 | 8/1892 | Sanders | 30—250 |
| 2,385,835 | 10/1945 | Neal | 30—250 |
| 2,583,346 | 1/1952 | Sprunger | 30—266 |
| 2,729,126 | 1/1956 | Stanton et al. | |
| 2,874,465 | 2/1959 | Sillak | 30—250 |
| 3,126,775 | 3/1964 | Ramge | 81—349 X |
| 3,164,054 | 1/1965 | Biesecker | 85—8.8 |

WILLIAM FELDMAN, *Primary Examiner.*

MILTON S. MEHR, *Examiner.*